(12) United States Patent
Chi et al.

(10) Patent No.: US 9,223,082 B2
(45) Date of Patent: Dec. 29, 2015

(54) BACKLIGHT ASSEMBLY AND LIQUID CRYSTAL DISPLAY DEVICE

(71) Applicants: BOE Technology Group Co., Ltd., Beijing (CN); Beijing BOE Display Technology Co., Ltd., Beijing (CN)

(72) Inventors: Hai Chi, Beijing (CN); Daekeun Yoon, Beijing (CN)

(73) Assignees: BEIJING BOE DISPLAY TECHNOLOGY Co., Ltd., Beijing (CN); BOE TECHNOLOGY GROUP Co., Ltd., Beijing (CN)

( * ) Notice: Subject to any disclaimer, the term of this patent is extended or adjusted under 35 U.S.C. 154(b) by 65 days.

(21) Appl. No.: 13/945,100

(22) Filed: Jul. 18, 2013

(65) Prior Publication Data

US 2014/0092344 A1    Apr. 3, 2014

(30) Foreign Application Priority Data

Sep. 28, 2012    (CN) .......................... 2012 1 0371640

(51) Int. Cl.
| | |
|---|---|
| *G02F 1/1333* | (2006.01) |
| *G02F 1/1335* | (2006.01) |
| *F21V 7/04* | (2006.01) |
| *F21V 8/00* | (2006.01) |

(52) U.S. Cl.
CPC ............ *G02B 6/0088* (2013.01); *G02B 6/0013* (2013.01); *G02B 6/0035* (2013.01); *G02B 6/0091* (2013.01); *G02F 1/133615* (2013.01)

(58) Field of Classification Search
CPC .... G02B 6/0091; G02B 6/002; G02B 6/0035; G02F 1/133615

USPC ....................... 362/632–634; 349/625, 58, 65
See application file for complete search history.

(56) References Cited

U.S. PATENT DOCUMENTS

2007/0263388 A1\* 11/2007 Lai et al. ........................ 362/287
2009/0237957 A1\*  9/2009 Tsubaki ........................ 362/615
2011/0141715 A1\*  6/2011 Uchida et al. .................. 362/19

FOREIGN PATENT DOCUMENTS

| CN | 101046579  | A |   | 10/2007 |
|----|-----------|---|---|---------|
| CN | 201166763 | Y | * | 12/2008 |
| CN | 102221164 | A |   | 10/2011 |
| CN | 102537793 | A |   |  7/2012 |
| JP | 11-174443 |   |   |  7/1999 |
| KR | 20090043215 | A | | 3/2010 |
| KR | 20110054783 | A | | 5/2011 |
| KR | 13P398303 | C |   | 12/2014 |

OTHER PUBLICATIONS

Extended European Search Report for European Patent Application No. 13174099.5 dated Feb. 18, 2014, 5pgs.

(Continued)

*Primary Examiner* — Nathanael R Briggs

(57) ABSTRACT

Embodiments of the present invention disclose a backlight assembly and a liquid crystal display device, and the backlight assembly comprises: a light guide plate; a base plate, disposed on an opposite side of a light emitting side of the light guide plate; and a back plate, disposed on a side of the light guide plate along an edge of the base plate, wherein an edge-type light source is disposed on a side facing the light guide plate of the back plate, the back plate is pivotally connected with the base plate via a rotation axis, and the back plate rotates about the rotation axis.

11 Claims, 1 Drawing Sheet

(56) References Cited

OTHER PUBLICATIONS

First Office Action issued by State Intellectual Property Office of the People's Republic of China for Chinese Patent Application No. 201210371640.4 dated Apr. 28, 2014, 7pgs.
English translation of First Office Action issued by State Intellectual Property Office of the People's Republic of China for Chinese Patent Application No. 201210371640.4 dated Apr. 28, 2014, 5pgs.
Office Action issued by the Korean Intellectual Property Office for Korean Patent Application No. 10-2013-0083667, 5pgs.
English translation of Office Action issued by the Korean Intellectual Property Office for Korean Patent Application No. 10-2013-0083687, 5pgs.
The State Intellectual Property Office of the People's Republic of China ("SIPO") (Chinese Language) Office Action issued on Dec. 22, 2014 by SIPO in Chinese Patent Application No. 201210371640.4; seven (7) pages.
English Translation of the State Intellectual Property Office of the People's Republic of China ("SIPO") Office Action issued on Dec. 22, 2014 by SIPO in Chinese Patent Application No. 201210371640.4; five (5) pages.
English abstract of CN201166763(Y) listed above, 1 page.
English abstract of C13P3983-03KR listed above, 2 pages.
Second Office Action from Korean Patent Office for Korean Application No. 10-2013-0083667 issued on Feb. 12, 2015; 2 pages.
Examination Report from Korean Patent Office for Korean Application No. 10-2013-0083667 issued on Feb. 12, 2015, 3 pages.
English Translation of Examination Report from Korean Patent Office for Korean Application No. 10-2013-0083667 issued on Feb. 12, 2015, 2 pages.
English Abstract of KR2009-0043215A listed above; 2 pages.
Korean Office Action (Korean language) issued by the Korean Intellectual Property Office ("KIPO") on Jun. 3, 2015 for Application No. 10-2015-0035915, four (4) pages.
English translation of Korean Office Action, listed above, for Application No. 10-2015-0035915, three (3) pages.

\* cited by examiner

BACKLIGHT ASSEMBLY AND LIQUID CRYSTAL DISPLAY DEVICE

CROSS REFERENCE TO RELATED APPLICATIONS

This application claims priority from Chinese National Application No. 201210371640.4, filed on Sep. 28, 2012, the contents of which are incorporated herein by reference.

BACKGROUND

Embodiments of the present invention relate to a backlight assembly and a liquid crystal display device.

Liquid crystal display devices have become the mainstream of the flat panel display devices in recent years due to the characteristics of long lifespan, high light efficiency, low radiation, low power consumption, and so on. Each of the liquid crystal display devices is mainly composed of a display panel and a backlight assembly, wherein the backlight assembly provides illumination with sufficient brightness and high uniformity for the display panel.

In a backlight assembly of the prior art, especially in an edge-type backlight assembly, light emitting from an edge-type light source has a fixed divergence angle, so when the poor display effect occurs due to the backlight assembly, for example, when the uneven distribution of light from the backlight assembly causes the uneven brightness of the image displayed by the display device, those skilled in the art can not improve it by adjusting the edge-type light source of the backlight assembly, and thus, the display effect of the display device is reversely affected.

SUMMARY

An embodiment of the present invention provide a backlight assembly and a liquid crystal display device, by setting a rotation axis on a back plate of the backlight assembly on which a edge-type light source is disposed, when the poor display effect occurs due to the backlight assembly, the direction of light emitting from the edge-type light source is adjusted in time, so that the display effect of the display device is improved.

An embodiment of the present invention provide a backlight assembly, comprising: a light guide plate; a base plate, disposed on an opposite side of a light emitting side of the light guide plate; and a back plate, disposed on a side of the light guide plate along an edge of the base plate, wherein an edge-type light source is disposed on a side facing the light guide plate of the back plate, the back plate is pivotally connected with the base plate via a rotation axis, and the back plate rotates about the rotation axis.

Alternatively, an angle formed between the back plate and a normal direction of the light guide plate is not larger than a divergence angle of emitting light of the edge-type light source.

Alternatively, a side surface facing the edge-type light source of the light guide plate is a concave surface.

Alternatively, the maximum rotating angle of the rotational axis is not larger than the divergence angle of the emission light of the edge-type light source.

Alternatively, a concave space formed by the concave surface of the light guide plate is larger than a space required by the rotation of the edge-type light source.

Alternatively, the edge-type light source is a light emitting diode.

Alternatively, the backlight assembly according to an embodiment of the present invention further comprises: a control module for controlling the rotation of the rotation axis.

On the other hand, an embodiment of the present invention further provide a liquid crystal display device, comprising: the above-mentioned backlight assembly; and a liquid crystal panel, which is located on a light emitting side of the backlight assembly.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

The embodiments of the present invention provide a backlight assembly and a liquid crystal display device capable of adjusting a light source of the backlight assembly in time when the backlight effect of the display device is poor.

In the following description, in order to make an illustration rather than a limitation, specific details such as particular system structure, interface, technique, and so on is given so as to understand the embodiments of the invention thoroughly. However, for those skilled in the art, it should be understood that the present invention also can be implemented in other embodiments without these specific details. In other cases, the detailed explanations of well-known devices, circuits, and methods are omitted lest the unnecessary details hinder the description of the present invention.

The embodiments of the present invention are specifically described as follows in connection with the drawings.

Figure 1:
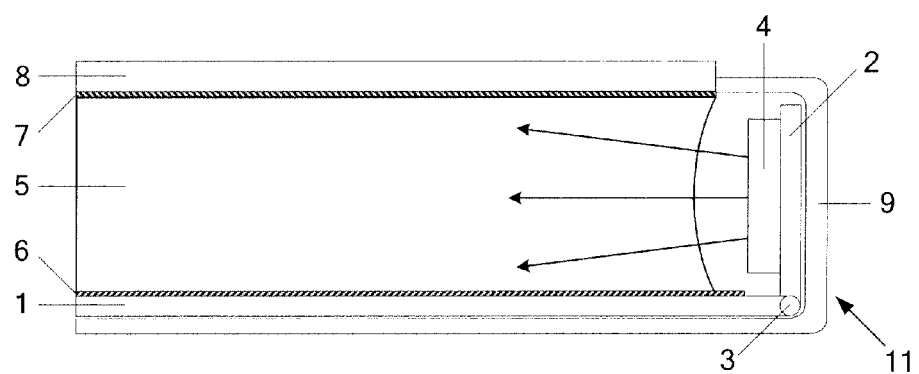
FIG. 1 is a simple structural schematic view of a display device comprising a backlight assembly and a liquid crystal panel according to an embodiment of the present invention.

An embodiment of the present invention provides a backlight assembly 11, as shown in FIG. 1, comprising: a light guide plate 5; a base plate 1, disposed on an opposite side of a light emitting side of the light guide plate 5; and a back plate 2, disposed on a side of the light guide plate 5 along an edge of the base plate 1, wherein an edge-type light source 4 is disposed on a side facing the light guide plate 5 of the back plate 2, the back plate 2 is pivotally connected with the base plate 1 via a rotation axis 3, and the back plate 2 can rotate about the rotation axis 3.

Figure 2:
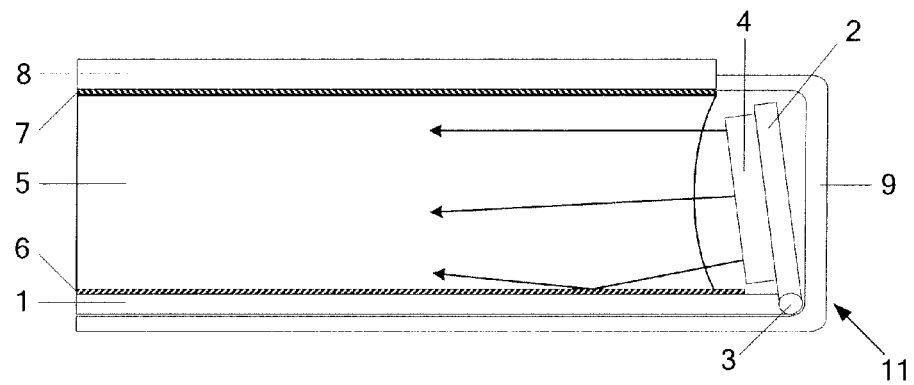
FIG. 2 is a simple structural schematic view after an edge-type light source of the backlight assembly rotates in the display device according to an embodiment of the present invention.

As shown in FIG. 2, after the back plate 2 of the backlight assembly 11 provided by an embodiment of the present invention rotates, that is, after the rotation axis 3 is rotated, an angle formed between the back plate 2 and the base plate 1 is changed. Meanwhile, the rotation of the back plate 2 makes the rotation of the edge-type light source 4, the direction of emitting light of the rotated edge-type light source 4 is also changed, and thereby the backlight effect of the display device is also correspondingly varied. By the above manner, the direction of the emitting light of the edge-type light source is adjusted appropriately.

In the backlight assembly according to an embodiment of the present invention, the back plate can rotate with the rotation of a rotation axis by disposing the rotation axis on the back plate of the backlight assembly so as to make the rotation of the edge-type light source to correspondingly adjust the edge-type light source in time, thereby making the illumination of the backlight assembly achieve the optimal effect to improve the display effect of the display panel.

Alternatively, an angle of the back plate 2 and a normal direction of the light guide plate 5 is not larger than the divergence angle of the emitting light of the edge-type light source 4. When emitting from the edge-type light source 4, the emitting light has a certain field angle, the edge-type light source 4 will emit light within the range of the certain field angle. When the edge-type light source 4 is placed horizontally, an angle formed by the field angle of the light source and the horizontal direction is called as the divergence angle of the edge-type light source 4, and the divergence angle is equal to a half of the field angle. The rotation of the rotation axis 3 will make the rotation of the back plate 2 so as to change the direction of the emitting light of the edge-type light source 4. When the angle formed between the back plate 2 and the normal direction of the light guide plate 5 is just equal to the divergence angle of the edge-type light source 4, and at this time, the light emitted by the edge-type light source 4 just enters into the light guide plate along the horizontal direction. If the rotation angle of the rotation axis 3 is too large, the light emitted by the edge-type light source 4 does not enter into the light guide plate along the horizontal direction, so that a part of the light guide plate 5 produces a dark area because no light enters. Accordingly, when the angle formed between the back plate 2 and the normal direction of the light guide plate 5 is not larger than the divergence angle of the edge-type light source 4, it can be guaranteed that in the light guide plate 5, there is not produced a dark area.

Furthermore, the backlight assembly according to an embodiment of the present invention, as shown in FIG. 1, further comprises: a reflection film layer 6, an optical film layer 7 and a frame 9, the reflection film layer 6 is located on a lower surface of the light guide plate 5, i.e., a surface opposite to a light emitting surface of the light guide plate 5, and is located between the light guide plate 5 and the base plate 1 to reflect light of the edge-type light source 4; the optical film layer 7 is located on a upper surface of the light guide plate 5, i.e., a light emitting surface of the light guide plate 5 to converge light emitted from the upper surface of the light guide plate 5; the frame 9 is located outside the base plate 1 and the back plate 2 to fix and protect the internal structure of the backlight assembly.

Alternatively, a side surface facing the edge-type light source 4 of the light guide plate 5 is a concave surface, a concave space formed by the concave surface of the light guide plate 5 is larger than a space required by the rotation of the edge-type light source 4 to make room for the rotation of the edge-type light source 4, and the concave surface will make the light divergent, such that the light emitting from the edge-type light source 4 is distributed more uniformly after entering into the light guide plate 5.

Alternatively, the backlight assembly according to an embodiment of the present invention further comprises: a control module for controlling the rotation of the rotation axis 3.

Alternatively, in an embodiment of the present invention, the rotation of the rotation axis 3 is controlled by the control module. The control module can be disposed on the outermost housing of the display device equipped with the backlight assembly according to an embodiment of the present invention, a operation method of the control module also can be designed correspondingly, for example, operation buttons of the control module can be disposed on the outer housing, and instructions are sent by pressing the buttons to accomplish the operations. In addition, those skilled in the art can know that controlling the rotation of the rotation axis can be implemented by further adopting the other manners, which are not limited here.

Moreover, an embodiment of the present invention further provide a liquid crystal display device, as shown in FIG. 1, comprising: the backlight assembly 11 as described above and a liquid crystal panel 8, wherein the liquid crystal panel 8 is located on a light emitting side of the backlight assembly 11.

Exemplarily, the liquid crystal panel 8 comprises: an array substrate; an opposite substrate, disposing to face the array substrate to form a liquid crystal cell; and a liquid crystal material, filled in the liquid crystal cell, wherein the opposite substrate is a color filter substrate. A pixel electrode of each pixel unit of the array substrate is used to apply an electric field, so as to control a rotation of the liquid crystal material and to perform a displaying operation and the backlight assembly provides the backlight for the liquid crystal panel.

Exemplarily, the liquid crystal display device can be applied to: any product or component having the display function, such as, a mobile phone, a panel computer, a television, a display, a laptop computer, a digital frame, a navigator, and so on.

In a backlight assembly and a liquid crystal display device according to an embodiment of the present invention, a back plate can rotate with the rotation of a rotation axis by setting the rotation axis on the back plate of the backlight assembly so as to make the rotation of the edge-type light source and to correspondingly adjust the edge-type light source in time, thereby making the illumination of the backlight source achieve the optimal effect to improve the display effect of the display panel.

The forgoing are only particular embodiments of the present invention, however, the protection scope of the present invention is not limited thereto. Any change or substitution, which can be easily conceived by those skilled in the art within the technical scope disclosed by the present invention, should be covered within the protection scope of the present invention. Thus, the protection scope of the present invention is only defined by the claims.

The invention claimed is:

1. A backlight assembly, comprising:
   a light guide plate;
   a base plate, disposed on an opposite side of a light emitting side of the light guide plate; and
   a back plate, disposed on a side of the light guide plate along an edge of the base plate,
   wherein an edge-type light source is disposed on a side facing the light guide plate of the back plate, the back plate is pivotally connected with the base plate via a rotation axis, and the back plate is rotatable about the rotation axis to vary backlight effect of the backlight assembly, wherein the base plate, the back plate and the rotation axis are separated from each other, wherein the rotation axis is positioned between one side surface of the back plate which is adjacent to the side where the edge-type light source is disposed and one side surface of the base plate, and the one side surface of the back plate and the one side surface of the base plate is rotatable about the rotation axis.

2. The backlight assembly according to claim 1, wherein an angle formed between the back plate and a normal direction of the light guide plate is not larger than a divergence angle of emitting light of the edge-type light source.

3. The backlight assembly according to claim 1, wherein a side surface facing the edge-type light source of the light guide plate is a concave surface.

4. The backlight assembly according to claim 3, wherein a concave space formed by the concave surface of the light guide plate is larger than a space required by the rotation of the edge-type light source.

5. The backlight assembly according to claim 1, wherein the edge-type light source is a light emitting diode.

6. The backlight assembly according to claim 1, further comprising: a control module for controlling the rotation of the rotation axis.

7. The backlight assembly according to claim 1, further comprising: a reflection film layer, disposed on a side opposite to a light emitting side of the light guide plate, located between the light guide plate and the base plate, and for reflecting light emitting from the edge-type light source.

8. The backlight assembly according to claim 1, further comprising: an optical film layer, disposed on a light emitting surface of the light guide plate to converge light emitted from the light emitting surface of the light guide plate.

9. The backlight assembly according to claim 1, further comprising: a frame, disposed outside the base plate and the back plate to fix and protect the internal structure of the backlight assembly.

10. A liquid crystal display device, comprising:
   the backlight assembly according to claim 1; and
   a liquid crystal panel, which is located on a light emitting side of the backlight assembly.

11. The liquid crystal display device according to claim 10, wherein the liquid crystal panel comprises:
   an array substrate;
   an opposite substrate, disposed to face the array substrate to form a liquid crystal cell; and
   a liquid crystal material, filled in the liquid crystal cell.

* * * * *